(12) United States Patent
Tsujimoto et al.

(10) Patent No.: US 7,671,124 B2
(45) Date of Patent: Mar. 2, 2010

(54) HYDROTALCITE AND SYNTHETIC RESIN COMPOSITION

(75) Inventors: Hideo Tsujimoto, Sakai (JP); Masahiro Suzuki, Sakai (JP); Masato Kurato, Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 97 days.

(21) Appl. No.: 10/548,864

(22) PCT Filed: Jun. 14, 2005

(86) PCT No.: PCT/JP2005/010864

§ 371 (c)(1),
(2), (4) Date: Dec. 1, 2005

(87) PCT Pub. No.: WO2006/043352

PCT Pub. Date: Apr. 27, 2006

(65) Prior Publication Data

US 2007/0106002 A1    May 10, 2007

(30) Foreign Application Priority Data

Oct. 20, 2004   (JP) .............................. 2004-305644

(51) Int. Cl.
*C08K 3/30*   (2006.01)
(52) U.S. Cl. ................... 524/436; 524/437; 524/434; 524/432
(58) Field of Classification Search ................ 524/437, 524/434, 436, 432
See application file for complete search history.

(56) References Cited

U.S. PATENT DOCUMENTS

| | | | | |
|---|---|---|---|---|
| 4,299,759 A * | 11/1981 | Miyata et al. | ................ | 524/424 |
| 5,141,980 A * | 8/1992 | Ranceze et al. | ............. | 524/399 |
| 5,399,537 A | 3/1995 | Bhattacharyya et al. | | |
| 6,166,124 A * | 12/2000 | Lange et al. | ................ | 524/451 |
| 6,287,532 B1 * | 9/2001 | Okada et al. | ............. | 423/420.2 |
| 6,313,208 B1 * | 11/2001 | Nosu et al. | ................... | 524/437 |
| 6,413,639 B1 * | 7/2002 | Kobayashi et al. | .......... | 428/403 |
| 6,418,661 B1 | 7/2002 | Takahashi et al. | | |

| 2002/0006375 A1 | 1/2002 | Okada et al. |

FOREIGN PATENT DOCUMENTS

| CN | 1248590 | 3/2000 |
|---|---|---|
| EP | 1052223 | 11/2000 |
| EP | 1 088 853 | 4/2001 |
| JP | 46-2280 | 1/1971 |
| JP | 47-32198 | 8/1972 |
| JP | 48-29477 | 9/1973 |
| JP | 50-30039 | 9/1975 |
| JP | 51-29129 | 8/1976 |
| JP | 55-080445 | 6/1980 |
| JP | 7-216166 | 8/1995 |
| JP | 8-127688 | 5/1996 |
| JP | 09-278952 | * 10/1997 |
| JP | 09-278952 A | * 10/1997 |
| JP | 11-349846 | 12/1999 |
| JP | 2000-159520 | 6/2000 |
| JP | 2001-2408 | 1/2001 |
| JP | 2001-164042 | 6/2001 |
| JP | 2002-293535 | 10/2002 |
| JP | 2003-064234 | 3/2003 |
| WO | WO-9901509 | 1/1999 |
| WO | WO9901509 | 1/1999 |

* cited by examiner

Primary Examiner—Ling-Siu Choi
(74) Attorney, Agent, or Firm—Gordan and Hamburg LLP

(57) ABSTRACT

It is an object of the present invention to provide hydrotalcite which can inhibit a white discoloration by water of a polyolefin film for agricultural uses, a blooming to the surface of a vinyl chloride resin film, a reduction in electric resistance in the case of using the hydrotalcite as a stabilizer of a vinyl chloride resin for covering wires, the occurrence of die drool in the case of using the hydrotalcite as a neutralizer of an acid catalyst residue in a polyolefin resin or a copolymer thereof, and coloring (yellowing) in extrusion in preparing pellets and can be suitably used as a resin additive, a method of producing the same and a synthetic resin composition containing the same.

Hydrotalcite expressed by the following formula (1);

$$[(Mg)_x(Zn)_y]_{1-z}(Al)_z(OH)_2(A^{n-})_{z/n} \cdot mH_2O \qquad (1)$$

in the formula $A^{n-}$ represents an anion having a valence of n, and x, y, z and m are values which satisfy the following expressions, $0.5 \leq x \leq 1$, $0 \leq y \leq 0.5$, $x+y=1$, $0.1 \leq z \leq 0.5$, $0 \leq m < 1$, and the hydrotalcite has a sodium content of 100 ppm or less and is used as a resin additive.

5 Claims, No Drawings

HYDROTALCITE AND SYNTHETIC RESIN COMPOSITION

TECHNICAL FIELD

The present invention relates to hydrotalcite, a method of producing the same and a synthetic resin composition.

BACKGROUND ART

Hydrotalcite is an inorganic compound containing magnesium, zinc and aluminum, and it is known from WO 99/01509, Japanese kokoku Publication Sho-46-2280, Japanese kokoku Publication Sho-47-32198, Japanese kokoku Publication. Sho-48-29477, Japanese kokoku Publication Sho-50-30039, Japanese kokoku Publication Sho-51-29129 and Japanese Kokai Publication Sho-55-80445, that by using it as an additive of synthetic resins for general purpose such as polyolefin, polyvinyl chloride and the like, properties as a heat stabilizer of resin or an acid-acceptor of resin can be attained. It is known that a resin composition containing the hydrotalcite is particularly superior in a thermal insulating property and thermal stability and this resin composition can be used in applications such as a film for agricultural uses and a resin for covering wires.

But, when the hydrotalcite is mixed into a polyolefin resin or a copolymer thereof, a problem that die drool or coloring (yellowing) occurs by being subjected to a step of heating for processing arises. Therefore, it has been desired to decrease the occurrence of die drool and coloring resulting from the hydrotalcite.

Further, as a film for agricultural uses, polyolefinic resin films such as a polyvinyl chloride film, a polyolefin film and an ethylene-vinyl acetate copolymer film are mainly used for houses or tunnels in protected horticulture. The performance required of such a film for agricultural uses varies with its use, applications and subjects of crops, and therefore various properties other than heat resistance may be required. However, in some cases, specific properties are deteriorated or other properties are not improved, depending on the additional amount of hydrotalcite.

For example, the films for agricultural uses are required to have properties such as weathering resistance (performance capable of resisting a long-term use in the sunny outdoors), an anti-fogging property (performance of preventing a phenomenon in which an inner surface of a covering film is covered with fine sweat through condensation due to high humidity in houses or tunnels and its transparency is deteriorated), a thermal insulating property (performance of maintaining temperature in facilities high during the night) and a translucency (transparency). With respect to a synthetic resin composition, containing the hydrotalcite, for polyolefin films for agricultural uses, it is known that when an amount of the hydrotalcite is increased, a white discoloration by water due to rainwater, moisture and sweat in uses further occurs as the hydrotalcite content in a film increases. Thus, it has been desired to inhibit a white discoloration by water of a polyolefin film for agricultural uses.

And, when the hydrotalcite is added to a vinyl chloride resin film in a relatively large amount, a blooming (effusion of powder) to the surface of a film arises and therefore countermeasures for this have been requested.

Further, the hydrotalcite is also used as a stabilizer of a vinyl chloride resin for covering wires in place of a lead stabilizer, use of which is not preferred from the view point of an environmental impact. But, when the conventional hydrotalcite having a sodium content of more than 100 ppm is used, there is a problem that the electric resistance (volume resistivity=VR) of the vinyl chloride resin is reduced compared with the case of using the lead stabilizer. Thus, there has been required such hydrotalcite that a vinyl chloride resin composition having the electric resistance which is equal to that in using the lead stabilizer can be obtained.

SUMMARY OF THE INVENTION

In view of the above state of the art, it is an object of the present invention to provide hydrotalcite which can inhibit a white discoloration by water of a polyolefin film for agricultural uses, a blooming to the surface of a vinyl chloride resin film, a reduction in electric resistance in the case of using the hydrotalcite as a stabilizer of a vinyl chloride resin for covering wires, the occurrence of die drool in the case of using the hydrotalcite as a neutralizer of an acid catalyst residue in a polyolefin resin or a copolymer thereof, and coloring (yellowing) in extrusion in preparing pellets and can be suitably used as a resin additive, a method of producing the same and a synthetic resin composition containing the same.

The present invention relates to hydrotalcite expressed by the following formula (1);

$$[(Mg)_x(Zn)_y]_{1-z}(Al)_z(OH)_2(A^{n-})_{z/n}\cdot mH_2O \qquad (1)$$

in the formula $A^{n-}$ represents an anion having a valence of n, and x, y, z and m are values which satisfy the following expressions, $0.5 \leq x \leq 1$, $0 \leq y \leq 0.5$, $x+y=1$, $0.1 \leq z \leq 0.5$, $0 \leq m < 1$, and the hydrotalcite has a sodium content of 100 ppm or less and is used as a resin additive.

The above hydrotalcite preferably has a specific surface area of 1 to 40 $m^2/g$.

The above hydrotalcite is preferably obtained by a hydrothermal synthesis at a temperature of 120 to 250° C.

The present invention also relates to a method of producing hydrotalcite, which comprises a step (I) of obtaining hydrotalcite slurry using magnesium sulfate as a magnesium source and a step (III) of washing with water.

In the above method of producing hydrotalcite, the above step (I) is preferably a step of obtaining hydrotalcite slurry by a hydrothermal synthesis at a temperature of 120 to 250° C.

The above method of producing hydrotalcite preferably further comprises a step of surface treating.

The present invention also relates to a synthetic resin composition, which contains the above hydrotalcite and a synthetic resin.

In the above synthetic resin composition, the content of the above hydrotalcite is preferably 0.01 to 20 parts by weight based on 100 parts by weight of the above synthetic resin.

Preferably, in the above synthetic resin composition, the synthetic resin is a vinyl chloride resin and the content of the above hydrotalcite is 0.1 to 5 parts by weight based on 100 parts by weight of the vinyl chloride resin.

Preferably, in the synthetic resin composition, the above synthetic resin is a polyolefin resin or a copolymer thereof, and the content of the above hydrotalcite is 0.01 to 15 parts by weight based on 100 parts by weight of the above polyolefin resin or the above copolymer thereof.

The above synthetic resin composition is preferably used as a film for agricultural uses.

DETAILED DESCRIPTION OF THE INVENTION

Hereinafter, the present invention will be described in detail.

The hydrotalcite of the present invention is expressed by the above-mentioned formula (1) and has a sodium content of 100 ppm or less. When such hydrotalcite is used as a resin additive, it improves the stability of resin against heat or ultraviolet light to give various physical properties required of resin, such as an excellent thermal insulating property.

As an example of specific applications as the above resin additive, there can be given, for example, a thermal insulating material for a polyolefin film for agricultural uses, a stabilizer for a vinyl chloride resin, a stabilizer of a vinyl chloride resin for covering wires and a neutralizer of an acid catalyst residue in a polyolefin resin or a copolymer thereof obtained by polymerization using an acid catalyst.

The present inventors have found that many of properties, which were assumed to be defects when using the conventional hydrotalcite in these uses, were resulted from sodium (Na) contained in the hydrotalcite. Accordingly, they have found that many problems in the conventional hydrotalcite can be resolved by using the hydrotalcite expressed by the above-mentioned formula (1) and having a sodium content of 100 ppm or less, and have completed the present invention.

For example, Na contained in the surface or in the interior of the hydrotalcite has a large effect on the occurrence of die drool to be produced when using the hydrotalcite as a neutralizer of an acid catalyst residue in a polyolefin resin or a copolymer thereof obtained by polymerization using an acid catalyst, or on coloring (yellowing) due to the deterioration of resin in extrusion in preparing pellets. Therefore, it is possible to decrease the die drool and the coloring (yellowing) significantly by reducing the sodium content in the hydrotalcite to a level of 100 ppm or less. That is, when using the hydrotalcite of the present invention as a neutralizer of an acid catalyst residue in a polyolefin resin or a copolymer thereof obtained by polymerization using an acid catalyst, the occurrence of die drool can be prevented without reducing an effect of neutralizing resin, and the coloring (yellowing) in extrusion in preparing pellets can also be prevented. Thus, it is possible to attain an advantage that an amount of expensive additives, such as an antioxidant, to be added can be reduced.

Also when the conventional hydrotalcite is added as a thermal insulating material of a polyolefin film for agricultural uses, the film becomes white due to sweat through condensation on the surface of film or sweat from rainwater, or prolonged contact with water causes the film to whiten and the white discoloration by water, which inhibits the transmission of light, occurs. It has become clear that Na contained in the surface or in the interior of the hydrotalcite has a large effect on this white discoloration by water. Accordingly, the white discoloration by water can be reduced significantly by reducing the sodium content in the hydrotalcite to a level of 100 ppm or less. That is, when the hydrotalcite of the present invention is added to a polyolefin film for agricultural uses for the purpose of improving a thermal insulating property, the occurrence of the white discoloration by water can be prevented.

The white discoloration by water arises also when the conventional hydrotalcite is used as a stabilizer for a vinyl chloride resin, but these phenomena are improved significantly in a vinyl chloride resin in which the hydrotalcite of the present invention is used as a stabilizer. The white discoloration by water can be acceleratingly tested and evaluated by a hot water whitening test in which a film is immersed in hot water.

And, the present inventors have found that Na contained in the surface or in the interior of the hydrotalcite has a large effect on the blooming to the surface of a film arising when the conventional hydrotalcite is used as a stabilizer for a vinyl chloride resin, and the blooming can be improved significantly by reducing the sodium content in the hydrotalcite to a level of 100 ppm or less. That is, when the hydrotalcite of the present invention is used as a stabilizer for a vinyl chloride resin, the occurrence of the blooming can be prevented and the white discoloration by water can be prevented.

And, the present inventors have found that Na contained in the surface or in the interior of the hydrotalcite has a large effect on the problem of the reduction of electric resistance (volume resistivity=VR) arising when the conventional hydrotalcite is used as a Ca/Zn stabilizer of a vinyl chloride resin for covering wires, and the reduction of electric resistance can be improved by reducing the sodium content in the hydrotalcite to a level of 100 ppm or less. That is, when the hydrotalcite of the present invention is used as a stabilizer of a vinyl chloride resin for covering wires, the reduction of electric resistance (volume resistivity=VR) can be prevented.

Further, it has been found that the hydrotalcite having a sodium content of 100 ppm or less can improve the transparency of a film when films for agricultural uses is produced using a synthetic resin composition containing the above hydrotalcite and a synthetic resin.

The hydrotalcite of the present invention is expressed by the above-mentioned formula (1) and has a sodium content of 100 ppm or less. When the sodium content is more than 100 ppm, it is not possible to sufficiently improve the above-mentioned white discoloration by water, blooming, electric resistance, die drool and coloring (yellowing). The content of Na is preferably 95 ppm or less and more preferably 90 ppm or less.

In the above formula (1), anions having a valence of n, expressed by $A^{n-}$, include $ClO_4^-$, $SO_4^{2-}$ and $CO_3^{2-}$, etc. Among others, $CO_3^{2-}$ is preferred. In the above formula (1), x satisfies $0.5 \leq x \leq 1$, and preferably satisfies $0.7 \leq x \leq 1$. y satisfies $0 \leq y \leq 0.5$, and preferably satisfies $0 \leq y \leq 0.3$. Here, $x+y=1$. And, in the above formula (1), z satisfies $0.1 \leq z \leq 0.5$, and preferably satisfies $0.2 \leq z \leq 0.4$. Further, in the above formula (1), m satisfies $0 \leq m < 1$, and preferably satisfies $0 \leq m \leq 0.7$.

The above hydrotalcite particles preferably have an average secondary particle diameter of 2 μm or less. In this case, since most of the hydrotalcite particles are primary particles and not agglomerates of primary particles, thermal stability and mechanical strength can be improved. The hydrotalcite particles preferably have an average secondary particle diameter of 0.4 to 1.0 μm. Incidentally, the above average secondary particle diameter is a value measured by the laser diffraction scattering method.

The above hydrotalcite preferably has a specific surface area of 1 to 40 m²/g. Thereby, thermal stability and mechanical strength can be improved. This specific surface area is more preferably 5 to 20 m²/g. Incidentally, a value of the above specific surface area is measured by the BET method.

The above hydrotalcite may have coating layer formed by surface treatment. Kinds of the coating layer and methods of surface treatment are not particularly limited.

The hydrotalcite of the present invention may be one produced by any method of producing as long as it satisfies the above properties, and for example, hydrotalcite obtained by a hydrothermal synthesis at a temperature of 120 to 250° C. can be given. Since hydrotalcite having a relatively large particle size can be obtained by the above method, hydrotalcite particles can be dispersed well in the synthetic resin composition containing the hydrotalcite and the synthetic resin. The good dispersivity is effective at improving the above-mentioned white discoloration by water, blooming, electric resistance, die drool and coloring (yellowing). The conditions other than temperature in the above hydrothermal synthesis is not particularly limited and for example, conditions of pressure 0.1 to 4 MPa, a synthesis time 1 to 12 hours can be employed.

Of methods of producing hydrotalcite through the above hydrothermal synthesis, a method of producing hydrotalcite, comprising the step (I) of obtaining hydrotalcite slurry using magnesium sulfate as a magnesium source and the step (III) of washing with water is preferred. Such a method is particularly preferred in that the sodium content in the hydrotalcite can be reduced efficiently.

That is, by using magnesium sulfate as a magnesium source in the above step (I), it is possible to conduct washing with water in the step (III) efficiently and to reduce Na efficiently.

When the hydrotalcite slurry is prepared by a hydrothermal synthesis using magnesium chloride as a magnesium source like a conventional method and using zinc sulfate, aluminum sulfate, sodium hydroxide and sodium carbonate as other components, a large amount of NaCl is produced as a by-product. Since this NaCl does not have high solubility in water and the temperature dependency of the solubility is low, the solubility in water does not become so high even in elevated temperatures in the hydrothermal synthesis. Thus, an amount of NaCl absorbed in particles of NaCl produced by a reaction is relatively large and this absorbed NaCl is hard to be removed through simple washing with water. Therefore, there may be cases where the sodium content in the hydrotalcite cannot be adequately reduced or number of the steps of washing with water becomes necessary.

On the other hand, in the above step (I), when the hydrotalcite slurry is prepared by a hydrothermal synthesis using magnesium sulfate as a magnesium source and using zinc sulfate, aluminum sulfate, sodium hydroxide and sodium carbonate as an example of other components, $Na_2SO_4$ is produced as a by-product. $Na_2SO_4$ has higher solubility in water than NaCl and the temperature dependency of its solubility is high. Thus, $Na_2SO_4$ becomes apt to dissolve in water in elevated temperatures in the hydrothermal synthesis, and an amount of $Na_2SO_4$ absorbed in the hydrotalcite particles is relatively small. Therefore, the removal of $Na_2SO_4$ adhering to the surfaces of the hydrotalcite particles in the step of washing with water allows the amount of Na to easily decrease.

As described above, in the conventional methods of producing hydrotalcite, since magnesium chloride was used as a magnesium source, Na ions were apt to be absorbed in the hydrotalcite particles and were hard to be removed efficiently through washing with water. And so, the sodium content in the hydrotalcite commonly commercialized became 120 to 300 ppm.

Therefore, the hydrotalcite of the present invention can be more efficiently produced by using a method of producing hydrotalcite, which comprises the above step (I) and the above step (III). The hydrotalcite obtained by such a method can sufficiently improve the above-mentioned white discoloration by water, blooming, electric resistance, die drool and coloring (yellowing). The method of producing hydrotalcite like this also constitutes the present invention.

In the method of producing hydrotalcite of the present invention, the above step (I) can be carried out, for example, by mixing magnesium sulfate, zinc sulfate, aluminum sulfate, sodium hydroxide and sodium carbonate and performing the hydrothermal synthesis. A method of reacting magnesium sulfate, zinc sulfate, aluminum sulfate, sodium hydroxide and sodium carbonate in the above step (I) can be performed using publicly known methods, but it is preferred to perform the hydrothermal synthesis by mixing an aqueous solution (a) of magnesium sulfate, zinc sulfate and aluminum sulfate, dissolved respectively, and an aqueous solution (b) of sodium hydroxide and sodium carbonate, dissolved respectively. By thus carrying out the step (I), the hydrotalcite particles can be produced.

The above aqueous solution (a) can be obtained by dissolving magnesium sulfate, zinc sulfate and aluminum sulfate in water by a common method. In this case, any of a method of simultaneously dissolving magnesium sulfate, zinc sulfate and aluminum sulfate in water, and a method of dissolving any one compound in water in advance, adding the other compounds to this solution and dissolving the mixture may be employed. And, the above aqueous solution (a) can also be obtained by mixing an aqueous solution obtained by dissolving magnesium sulfate in water and respective aqueous solutions obtained by dissolving zinc sulfate and aluminum sulfate separately in water. In this case, in a method of mixing the aqueous solution of magnesium sulfate, the aqueous solution of zinc sulfate and the aqueous solution of aluminum sulfate, these aqueous solutions may be mixed in any order. In the above aqueous solution (a), the proportions of the above magnesium sulfate, the above zinc sulfate and the above aluminum sulfate to be mixed can be appropriately selected so as to satisfy the conditions in the above formula (1).

The above aqueous solution (b) can be obtained by dissolving sodium hydroxide and sodium carbonate in water by a publicly known method. In this case, any of a method of simultaneously dissolving sodium hydroxide and sodium carbonate in water, and a method of dissolving any one compound in water in advance, and further adding the other compound to this solution and dissolving the mixture may be employed. And, the above aqueous solution (b) can also be obtained by mixing an aqueous solution obtained by dissolving sodium hydroxide in water and an aqueous solution obtained by dissolving sodium carbonate in water. In this case, there can be employed any of a method of adding the aqueous solution of sodium hydroxide to the aqueous solution of sodium carbonate and a method of adding the aqueous solution of sodium carbonate to the aqueous solution of sodium hydroxide.

In the above aqueous solution (b), the amounts of the above sodium hydroxide and the above sodium carbonate to be mixed may be appropriately selected so as to be able to obtain the hydrotalcite expressed by the above formula. And, in the above aqueous solution (b), it is possible to appropriately replace $A^{n-}$ in the above formula (1) with $SO_4^{2-}$ by adjusting the amount of sodium hydroxide to be mixed, or a part or all of $A^{n-}$ in the above formula (1) with $ClO_4^-$ by changing a part or all of the above sodium carbonate to sodium hypochlorite.

In the above step (I), a method of mixing the above aqueous solution (a) and the above aqueous solution (b) is not particularly limited as long as it is a method by which an ingredient in the solution (a) and an ingredient in the solution (b) can be mixed, and the publicly known method can be used. Among others, a method of simultaneously charging the above aqueous solution (a) and the above aqueous solution (b) into a container for a reaction is preferred. Thereby, the hydrotalcite slurry can be produced efficiently in the hydrothermal synthesis. In addition, when charging the above aqueous solution (b) into a container for a reaction, the aqueous solution of sodium hydroxide and the aqueous solution of sodium carbonate may be charged separately.

The above step (I) can be carried out by applying the publicly known hydrothermal synthesis method after mixing the above aqueous solution (a) and the above aqueous solution (b). As the publicly known hydrothermal synthesis method, there can be given, for example, a method of pressurizing to synthesize the hydrotalcite in an autoclave, a method of synthesizing the hydrotalcite sequentially with an multistage autoclave and a method of pressurizing to synthesize the hydrotalcite continuously in a pipe.

Reaction conditions of the above hydrothermal synthesis is not particularly limited as long as it is the conditions under which the hydrotalcite expressed by the above formula (1) can be prepared and it can be appropriately determined, and the hydrotalcite can be synthesized, for example, under the conditions of temperature 120 to 250° C., pressure 0.1 to 4 MPa, a synthesis time 1 to 12 hours. When the levels of the conditions are less than lower limits of the above range, there is a possibility that the hydrotalcite expressed by the above formula (1) cannot be obtained. When the levels of the conditions are more than upper limits, the synthesis may become economically disadvantageous. By carrying out the hydrothermal synthesis under the conditions like these, hydrotalcite having a relatively large particle size can be obtained. In the hydrotalcite having a relatively large particle size, the force agglomerating primary particles is small. Therefore, since hydrotalcite particles can be dispersed well in a synthetic resin composition, it is possible to improve the above-mentioned white discoloration by water, blooming, electric resistance, die drool and coloring (yellowing).

The above step (III) can be carried out by publicly known methods by which slurry is washed with water. The publicly known methods include, for example, a method of filtering and washing with water, a method of repulping and washing with water (resuspending and washing with water) and a method of removing a water content from slurry by decantation or centrifugation and washing with water but are not limited to these. And, at the occasion of washing with water, ion-exchanged water or purified water can be used in order to remove $Na_2SO_4$ or NaCl as an impurity efficiently, or hot water of 30° C. or higher can be used in order to enhance the solubility of a salt content and wash with water efficiently.

The above method of producing hydrotalcite may comprise a step of surface treating the hydrotalcite. The above surface treating can be conducted by a method of conducting it in a step (II) of surface treating, which is carried out between the step (I) and the step (III), a method of conducting it in a step (IV-1) of applying wet treatment to filtered cake after the step (III) or a method of conducting it in a step (IV-2) of applying dry treatment to a substance obtained by drying the filtered cake and then milling this as required. The above surface treating may be conducted in a plurality of steps of these steps. When surface treating the hydrotalcite is carried out, it is favorable in that the surface of the hydrotalcite particles is modified from hydrophilic to lipophilic and the compatibility with a synthetic resin can be improved.

The above surface treatment agent is not particularly limited and includes, for example, higher fatty acids, silane-, titanate- and aluminum-coupling agents, phosphate esters, anionic surfactants, and esters of polyhydric alcohols and fatty acids.

As the above higher fatty acids, there can be given, for example, stearic acid, erucic acid, palmitic acid, lauric acid and behenic acid, and alkali metal salts of the higher fatty acids may be used.

As the above silane coupling agents, there can be given, for example, vinylethoxysilane, vinyl-tris(2-methoxy-ethoxy)silane, γ-methacryloxypropyl trimethoxysilane, γ-aminopropyl trimethoxysilane, β-(3,4-epoxycyclohexyl)ethyl trimethoxysilane, γ-glycidoxypropyl trimethoxysilane and γ-mercaptopropyl trimethoxysilane.

As the above titanate coupling agents, there can be given, for example, isopropyltriisostearoyl titanate, isopropyltris (dioctylpyrophosphate)titanate, isopropyltri(N-aminoethyl-aminoethyl)titanate and isopropyltridecylbenzenesulfonyl titanate.

As the above aluminum coupling agents, there can be given, for example, acetoalkoxyaluminium diisopropylate.

As the above phosphate esters, there can be given, for example, acid and alkali metal salts and amine salts of mono- or di-esters of orthophosphoric acid and alcohols such as oleyl alcohol and stearyl alcohol or mixtures thereof.

As the above anionic surfactants, there can be given, for example, sulfuric ester salts of higher alcohols such as stearyl alcohol and oleyl alcohol, sulfuric ester salts of polyethylene glycol ethers, amide-bonded sulfuric ester salts, ester-bonded sulfuric ester salts, amide-bonded sulfonates, ether-bonded sulfonates, ether-bonded alkyl aryl sulfonates, ester-bonded alkyl aryl sulfonates and amide-bonded alkyl aryl sulfonates.

As the above esters of polyhydric alcohols and fatty acids, there can be given, for example, glycerin monostearate and glycerin monooleate. It is preferred to use higher fatty acids such as stearic acid, erucic acid, palmitic acid, lauric acid and behenic acid among the above surface treatment agents. Thereby, the sodium content in the hydrotalcite can be efficiently reduced in washing with water of the step (III).

A method of surface treating in the above step (II) can be performed by coating the surface of hydrotalcite particle in the hydrotalcite slurry obtained in the above step (I) using the above surface treatment agents. A method of surface treating in the above step (IV-1) can be performed using a publicly known wet or dry process after washing with water of the step (III).

The surface treatment in the above step (II) can be conducted by adding a liquid or emulsion of surface treatment agent to a slurry of hydrotalcite particles and thoroughly mixing these mechanically at a temperature of 100° C. or lower. A wet process in which surface treatment is performed in the above step (IV-1) can also be performed by applying the same procedure as in the above step (II) to slurry or filtered cake.

The dry process in the above step (IV-2) can be performed by adding a liquid, emulsion or solid surface treatment agent to hydrotalcite particles while stirring the particles thoroughly with a mixer such as a Henschel mixer and thoroughly mixing these with or without application of heat.

In the above surface coating, the amount of the surface treatment agent added can be appropriately established but is preferably 10 parts by weight or less based on 100 parts by weight of the above hydrotalcite particles.

In the above method of producing hydrotalcite, the above step (III) is a step of washing with water the hydrotalcite slurry obtained, by performing the above step (I), and the above step (II) as required. By performing the above step (III), it is possible to reduce the sodium content in the hydrotalcite expressed by the above formula (1) to a level of 100 ppm or less. Since in the step (III) in the above method of producing hydrotalcite, the hydrotalcite slurry containing $Na_2SO_4$ instead of NaCl as an impurity is washed with water, it is possible to wash with water very efficiently.

The present invention also relates to a synthetic resin composition containing the above-mentioned hydrotalcite of the present invention and the synthetic resin. For example, when a synthetic resin composition formed by adding the above hydrotalcite to a polyolefin resin is used as a polyolefin film for agricultural uses, the white discoloration by water in the film can be prevented. And, when a synthetic resin composition formed by adding the above hydrotalcite to a vinyl chloride resin is used, the blooming to the surface of a vinyl chloride resin film can be inhibited. And, when hydrotalcite is used as a heat stabilizer (particularly a calcium/zinc stabilizer of resin for covering wires) of a vinyl chloride resin, Na existing in the hydrotalcite unfavorably causes the reduction of electric resistance (volume resistivity=VR) as a covering material of wires, but the hydrotalcite described above can prevent the occurrence of the reduction of electric resistance like this since it has a sodium content of 100 ppm or less. Further, when the hydrotalcite is added as a neutralizer of an acid catalyst residue in a polyolefin resin or a copolymer thereof, the occurrence of die drool can be inhibited and the coloring (yellowing) in extrusion in preparing pellets can also be inhibited.

The above synthetic resin may be one which is generally used for molded articles or film applications and includes, for example, a thermoplastic synthetic resin.

As the above synthetic resin, there can be given thermoplastic synthetic resins which are polymers or copolymers of olefins having 2 to 8 carbon atoms ($\alpha$-olefins) such as polyethylene, polypropylene, ethylene-propylene copolymer, polybutene and poly(4-methylpentene-1), copolymers of these olefins with dienes, ethylene-acrylate copolymer, polystyrene, ABS resin, AAS resin, AS resin, MBS resin, ethylene-vinyl chloride copolymer, ethylene-vinyl acetate copolymer, ethylene-vinyl chloride-vinyl acetate graft polymer, vinylidene chloride, polyvinyl chloride, chlorinated polyethylene, chlorinated polypropylene, vinyl chloride-propylene copolymer, vinyl acetate resin, phenoxy resin, polyacetals, polyamides, polyimides, polycarbonates, polysulfones, polyphenylene oxide, polyphenylene sulfide, polyethylene terephthalate, polybutylene terephthalate and methacrylic resins.

Among others, polyolefin resins, copolymers thereof and halogen-containing resins thereof are preferred from the viewpoint of heat deterioration prevention and mechanical strength retaining characteristics by the hydrotalcite. Specifically, there can be given polypropylene resins such as polypropylene homopolymer and ethylene-propylene copolymer; polyethylene resins such as high-density polyethylene, low-density polyethylene, straight chain low-density polyethylene, ultra low-density polyethylene, EVA (ethylene vinyl acetate resin), EEA (ethylene ethyl acrylate resin), EMA (ethylene-methyl acrylate copolymer resin), EAA (ethylene-acrylic acid copolymer resin) and ultra high molecular weight polyethylene; and polymers or copolymers of olefins having 2 to 6 carbon atoms ($\alpha$-ethylene) such as polybutene and poly(4-methylpentene-1). Polyethylene, polypropylene, polybutene, poly(4-methylpentene-1) or copolymers thereof are more preferred. And, as the above synthetic resin, vinyl chloride or a copolymer thereof can also be given.

Further, as the above synthetic resin, there can be given thermosetting resins such as epoxy resins, phenolic resins, melamine resins, unsaturated polyester resins, alkyd resins and urea resins, and synthetic rubber such as EPDM, butyl rubber, isoprene rubber, SBR, NBR and chlorosulfonated polyethylene. These synthetic resins may be used alone or in combination of two or more species.

In the above synthetic resin composition, the content of the above hydrotalcite is preferably 0.01 to 20 parts by weight based on 100 parts by weight of the synthetic resin in the above synthetic resin composition. When the content is less than 0.01 parts by weight, an effect of adding the hydrotalcite may not be recognized. When it is more than 20 parts by weight, the above-mentioned white discoloration by water, blooming, reduction in electric resistance, die drool and coloring (yellowing) may arise. It is more preferably 0.03 to 15 parts by weight.

In the above synthetic resin composition, when the above synthetic resin is a vinyl chloride resin, the hydrotalcite in the above synthetic resin composition (a vinyl chloride resin composition) can function as a stabilizer for a vinyl chloride resin. In this case, if the sodium content in the hydrotalcite is 100 ppm or less, the blooming to the surface of a film can be prevented. And, when hydrotalcite is used as a heat stabilizer (particularly a calcium/zinc stabilizer of resin for covering wires) of a vinyl chloride resin, Na existing in the hydrotalcite unfavorably causes the reduction of electric resistance (volume resistivity=VR) as a covering material of wires, but since the hydrotalcite described above has a sodium content as low as 100 ppm or less, it is possible to prevent the occurrence of the reduction in electric resistance like this.

In the above synthetic resin composition, when the above synthetic resin is a vinyl chloride resin, the content of the above hydrotalcite is preferably 0.1 to 5 parts by weight based on 100 parts by weight of the vinyl chloride resin in the above synthetic resin composition (a vinyl chloride resin composition) When the content is less than 0.1 parts by weight, the hydrotalcite may not adequately function as a stabilizer for a vinyl chloride resin. When it is more than 5 parts by weight, the blooming may arise in a film obtained using the vinyl chloride resin composition. It is more preferably 0.15 to 3 parts by weight.

In the above synthetic resin composition, when the above synthetic resin is a polyolefin resin or a copolymer thereof like the above, the hydrotalcite in the above synthetic resin composition (a composition of a polyolefin resin or a copolymer thereof) can function as a neutralizer of an acid catalyst residue in the polyolefin resin or the copolymer thereof obtained by polymerization using an acid catalyst. In this case, since the sodium content in the hydrotalcite is as low as 100 ppm or less, die drool, or coloring (yellowing) due to the deterioration of resin in extrusion in preparing pellets can be prevented.

In the above synthetic resin composition, when the above synthetic resin is a polyolefin resin or a copolymer thereof, the content of the above hydrotalcite is preferably 0.01 to 15 parts by weight based on 100 parts by weight of the polyolefin resin or the copolymer thereof in the above synthetic resin composition (a composition of a polyolefin resin or a copolymer thereof). When the content is less than 0.01 parts by weight, the hydrotalcite may not adequately function as a neutralizer of an acid catalyst residue. When it is more than 15 parts by weight, it is economically disadvantageous. It is more preferably 0.02 to 0.15 parts by weight as a neutralizer of an acid catalyst residue. And, when the hydrotalcite is used as a thermal insulating material of a polyolefin film for agricultural uses, the hydrotalcite content is more preferably 0.5 to 15 parts by weight.

The above synthetic resin composition may contain other additives in addition to the above components. The above other additives include, for example, an antioxidant, an ultraviolet screening agent, an antistatic agent, pigment, a foaming agent, a plasticizer, filler, a reinforcement, an organic halogen flame retardant, a crosslinking agent, an optical stabilizer, an ultraviolet absorber, a lubricant, other inorganic and organic heat stabilizers and the like.

A method of producing the above synthetic resin composition is not particularly limited and for example, a method of mixing the above-mentioned hydrotalcite expressed by the above formula (1) and having a sodium content of 100 ppm or less into a synthetic resin as uniformly as possible together with or separately from other additives may be employed. Mixing can be carried out by publicly known methods of mixing, and a method of mixing, for example, with a ribbon blender, a high-speed mixer, a kneader, a pelletizer or an extruder, and a method of adding a suspension of a resin additive comprising hydrotalcite as an effective ingredient to a post-polymerization slurry and stirring and drying the mixture can be given.

Since the above synthetic resin composition is expressed by the above formula (1) and has a sodium content of 100 ppm or less, it becomes free of the detrimental effects of die drool or coloring (yellowing) due to the deterioration of resin in extrusion in preparing pellets and can be suitably used as a thermal insulating material of a polyolefin film for agricultural uses, a stabilizer for a vinyl chloride resin and a neutralizer of an acid catalyst residue in a polyolefin resin or a copolymer thereof obtained by polymerization using an acid catalyst. Therefore, the above synthetic resin composition can be suitably used for films for agricultural uses, a stabilizer for a vinyl chloride resin and a neutralizer of an acid catalyst residue.

The hydrotalcite of the present invention is expressed by the above formula (1) and has a sodium content of 100 ppm or less and is used as a resin additive. Therefore, when the above hydrotalcite is used as a thermal insulating material of a polyolefin film for agricultural uses, the white discoloration by water can be prevented. And, when the hydrotalcite of the present invention is used as a stabilizer for a vinyl chloride resin, the blooming to the surface of a film can be inhibited. Also, when it is used as a stabilizer of a vinyl chloride resin for covering wires, the reduction of electric resistance (volume resistivity=VR) can be prevented. Further, when the hydrotalcite is used as a neutralizer of an acid catalyst residue contained in a polyolefin resin or a copolymer thereof obtained by polymerization using an acid catalyst, the occurrence of die drool can be inhibited and the occurrence of coloring (yellowing) in extrusion in preparing pellets can be inhibited. Accordingly, the above hydrotalcite can be suitably employed as a resin additive for various synthetic resins.

EFFECTS OF THE INVENTION

Since the hydrotalcite of the present invention has a sodium content of 100 ppm or less and provides effects of preventing the white discoloration by water, inhibiting the blooming, preventing the reduction in electric resistance (volume resistivity=VR), and inhibiting the occurrences of die drool and coloring (yellowing) in extrusion in preparing pellets, it can be suitably employed as a resin additive for various synthetic resins. Thus, the synthetic resin composition containing the above hydrotalcite and the synthetic resin can be suitably used in films for agricultural uses, which are used for houses or tunnels in protected horticulture, such as a polyolefin film for agricultural uses and a vinyl chloride resin film.

BEST MODE FOR CARRYING OUT THE INVENTION

Hereinafter, the present invention will be described in more detail by way of examples, but the present invention is not limited to these examples. In addition, "part(s)" and "%" refer to "part(s) by weight" and "weight %", respectively, in Examples, unless otherwise specified.

EXAMPLE 1

Preparation of Hydrotalcite

Water 400 ml was put in a 3 liter reactor, and to this, 800 ml of a mixed aqueous solution ($Mg^{2+}$ concentration 33.0 g/l, $Al^{3+}$ concentration 17.0 g/l) of magnesium sulfate salt and aluminum sulfate salt and 800 ml of a mixed aqueous solution (NaOH concentration 166.2 g/l, $Na_2CO_3$ concentration 170 g/l) of sodium hydroxide and sodium carbonate were added simultaneously while stirring and then the hydrothermal synthesis was carried out at 200° C. for 4 hours. The resulting hydrotalcite slurry was kept at 95° C. and surface treated by adding 5 g of stearic acid. Next, after filtration of the slurry, filtered cake was washed with 10 l of water of 35° C., and the resulting cake washed with water was dried at 100° C. for 24 hours and milled to obtain hydrotalcite. The obtained hydrotalcite had a Na content of 47 ppm and a Fe content of 24 ppm.

EXAMPLE 2

Preparation of Hydrotalcite

Water 400 ml was put in a 3 liter reactor, and to this, 800 ml of a mixed aqueous solution ($Mg^{2+}$ concentration 33.0 g/l, $Al^{3+}$ concentration 17.0 g/l) of magnesium sulfate salt and aluminum sulfate salt and 800 ml of a mixed aqueous solution (NaOH concentration 166.2 g/l, $Na_2CO_3$ concentration 170 g/l) of sodium hydroxide and sodium carbonate were added simultaneously while stirring and the hydrothermal synthesis was carried out at 200° C. for 4 hours. The resulting hydrotalcite slurry was kept at 95° C. and surface treated by adding 100 ml of a 50 g/l aqueous solution of sodium stearate. Next, filtration and washing with water were carried out in the same manner as in Example 1, and the resulting cake washed with water was dried at 100° C. for 24 hours and milled to obtain hydrotalcite. The obtained hydrotalcite had a Na content of 75 ppm and a Fe content of 33 ppm.

COMPARATIVE EXAMPLE 1

Preparation of Hydrotalcite

Water 400 ml was put in a 3 liter reactor, and to this, 800 ml of a mixed aqueous solution ($Mg^{2+}$ concentration 33.0 g/l, $Al^{3+}$ concentration 17.0 g/l) of magnesium chloride salt and aluminum sulfate salt and 800 ml of a mixed aqueous solution (NaOH concentration 166.2 g/l, $Na_2CO_3$ concentration 170 g/l) of sodium hydroxide and sodium carbonate were added simultaneously while stirring and the hydrothermal synthesis was carried out at 200° C. for 4 hours. The resulting hydrotalcite slurry was kept at 95° C. and surface treated by adding 100 ml of a 50 g/l aqueous solution of sodium stearate. Next, filtration and washing with water were carried out in the same manner as in Example 1, and the resulting cake washed with water was dried at 100° C. for 24 hours and milled to obtain hydrotalcite. The obtained hydrotalcite had a Na content of 290 ppm and a Fe content of 50 ppm.

EXAMPLE 3

Preparation of Hydrotalcite

Water 400 ml was put in a 3 liter reactor, and to this, 800 ml of a mixed aqueous solution ($Mg^{2+}$ concentration 33.0 g/l, $Al^{3+}$ concentration 17.0 g/l) of magnesium chloride salt and aluminum sulfate salt and 800 ml of a mixed aqueous solution (NaOH concentration 166.2 g/l, $Na_2CO_3$ concentration 170 g/l) of sodium hydroxide and sodium carbonate were added simultaneously while stirring and the hydrothermal synthesis was carried out at 200° C. for 4 hours. The resulting hydrotalcite slurry was kept at 95° C. and surface treated by adding 100 ml of a 50 g/l aqueous solution of sodium stearate. In order to reduce a Na content, after filtration and washing with water were carried out in the same manner as in Example 1, the filtered hydrotalcite was repulped with 2 liter of ion-exchanged water of 35° C. and then filtered. Then, filtered hydrotalcite was dried at 100° C. for 24 hours and milled to obtain hydrotalcite. The obtained hydrotalcite had a Na content of 87 ppm and a Fe content of 50 ppm.

EXAMPLE 4

Preparation of Hydrotalcite

Water 400 ml was put in a 3 liter reactor, and to this, 800 ml of a mixed aqueous solution ($Mg^{2+}$ concentration 28.9 g/l, $Zn^{2+}$ concentration 11.0 g/l, $Al^{3+}$ concentration 17.0 g/l) of magnesium sulfate salt, aluminum sulfate salt and zinc sulfate and 800 ml of a mixed aqueous solution (NaOH concentration 166.2 g/l, $Na_2CO_3$ concentration 170 g/l) of sodium hydroxide and sodium carbonate were added simultaneously while stirring and then the hydrothermal synthesis was carried out at 200° C. for 4 hours. The resulting hydrotalcite slurry was kept at 95° C. and surface treated by adding 5 g of stearic acid. Next, filtration and washing with water were carried out in the same manner as in Example 1, and the resulting cake washed with water was dried at 100° C. for 24 hours and milled to obtain hydrotalcite. The obtained hydrotalcite had a Na content of 14 ppm and a Fe content of 12 ppm.

In the method of producing in Example 3, since magnesium chloride was used as a raw material, repulping and washing with water is required in order to reduce the sodium content in the hydrotalcite to a level of 100 ppm or less. From this, it is shown that the method using magnesium chloride as a raw material has a lower efficiency of washing with water than the method (Examples 1 and 2) using magnesium sulfate as a raw material.

Incidentally, the Na and Fe contents in the synthesized hydrotalcite described above were measured by the following methods.

(Method of Analyzing Na)

About 1 g of the synthesized hydrotalcite was sampled and to this, 30 ml of ether and 20 ml of nitric acid (1+10) were added and shaken well to dissolve the sample completely, and the resulting solution was left standing for 5 minutes and then a portion of a water layer separated was taken and put in a beaker, and this portion was gradually heated to purge dissolved ether. After cooling this solution, the solution was filtered with a 5C filter paper and distilled water was added to make 100 ml of a test liquid. This test liquid was analyzed with an atomic absorption spectrophotometer (Z-800 produced by Hitachi, Ltd.).

(Method of Analyzing Fe)

As with the above-mentioned method of analyzing Na, a prepared sample was analyzed with an atomic absorption spectrophotometer (described above).

EXAMPLES 5 TO 7, COMPARATIVE EXAMPLES 2 TO 4

Preparation of Polyolefin Film for Agricultural Uses

Each film containing the hydrotalcite synthesized in Example 1 was prepared as a thermal insulating material of a polyolefin film for agricultural uses (Examples 5 to 7). And, each of films containing the hydrotalcite synthesized in Comparative Example 1 was prepared (Comparative Examples 2 to 4). Each film was produced by the following method.

A master batch was prepared in a formulation shown in Table 1 and then using the obtained master batch, LDPE (low density polyethylene, MFR is 5 produced by UBE INDUSTRIES, LTD., polyethylene F522N) and the master batch were mixed in such a way that the amounts of the hydrotalcites shown in Table 2 added to the resin are 5.0, 7.5 and 10.0 parts by weight, and a film with thickness of 100 µm was produced with a single screw extruder (T die). The transparency (haze value), the white discoloration by hot water and the appearance of a film of the obtained films were evaluated by the following methods and the results of evaluation are shown in Table 2.

(Transparency)

With respect to the film with thickness of 100 µm, a haze value was measured according to JIS K 7136 with a haze meter produced by NIPPON DENSHOKU INDUSTRIES CO., LTD.

(White Discoloration by Hot Water)

After the film with thickness of 100 µm was immersed for 24 hours in hot water of 40° C., it was taken out and dried for 10 minutes, and its haze value was measured with a haze meter.

(Appearance of Film)

Each film with width of 10 cm and thickness of 100 µm was extruded with an extruder and rolled up with a winder, and when an outer diameter of the roll of film reached 150 mm, a core tube of the winder was replaced. The film rolled up on the core tube was used for the appearance test of film and in this test, each film was apposed and its appearance was visually observed. In addition, it was observed that a film which has a large haze value in the above-mentioned transparency evaluation and therefore poor transparency was whitish or white in the appearance, and defective dispersion of the hydrotalcite emerges remarkably in this film.

TABLE 1

|  | Formulation (% by weight) |
| --- | --- |
| LDPE(MFR = 24) | 49.9 |
| StabiacePH-1010 | 0.05 |
| StabiaceP-2400 | 0.05 |
| Hydrotalcite | 50 |

TABLE 2

|  | Example 5 | Example 6 | Example 7 | Comparative Example 2 | Comparative Example 3 | Comparative Example 4 |
| --- | --- | --- | --- | --- | --- | --- |
| Used hydrotalcite (Na ppm) | Hydrotalcite in Example 1 47 | Hydrotalcite in Example 1 47 | Hydrotalcite in Example 1 47 | Hydrotalcite in Comparative Example 1 290 | Hydrotalcite in Comparative Example 1 290 | Hydrotalcite in Comparative Example 1 290 |
| Parts of hydrotalcite based on 100 parts of total resin in film | 5.0 | 7.5 | 10.0 | 5.0 | 7.5 | 10.0 |
| Transparency (haze) | 4.23 | 4.76 | 5.17 | 5.68 | 6.05 | 6.41 |
| White discoloration by hot water | 4.92 | 5.31 | 5.66 | 6.38 | 6.71 | 7.05 |
| Appearance of film | good | good | good | whitish | whitish | white |

LDPE (low density polyethylene, MFR is 24 produced by TOSOH CORPORATION, Petrosen 202R: used for a master batch)

Stabiace PH-1010 (produced by Sakai Chemical Industry Co., Ltd., phenolic antioxidant)

Stabiace P-2400 (produced by Sakai Chemical Industry Co., Ltd., phosphorus antioxidant)

From Table 2, it has become clear that when the hydrotalcite, in which the Na content contained in the surface or in the interior of the hydrotalcite is 47 ppm, is used, the white discoloration by hot water does not arise even though the amounts of the hydrotalcites added are 5.0, 7.5 and 10.0 parts by weight. And, these films have the excellent transparency and the appearance of film.

(Thermal Stability)

The obtained sheet was put in a gear oven of 180° C., and it was taken out every 10 minutes and the thermal stability was investigated based on the quality of blackening of the sheet.

(Volume Resistivity: VR)

Using the obtained sheet, a 14 cm square pressed sheet of 1.0 mm in thickness was produced and stored in a desiccator of 30° C., 60% RH for a day and the volume resistivity (Ω·cm) was measured according to JIS K 6723.

TABLE 3

|  | Example 8 | Example 9 | Example 10 | Example 11 | Comparative Example 5 |
|---|---|---|---|---|---|
| PVC(parts) | 100 | 100 | 100 | 100 | 100 |
| DOP(parts) | 50 | 50 | 50 | 50 | 50 |
| Hydrotalcite in Example 1 (Na = 47 ppm, parts) | 1.5 | — | — | — | — |
| Hydrotalcite in Example 2 (Na = 75 ppm, parts) | — | 1.5 | — | — | — |
| Hydrotalcite in Example 3 (Na = 87 ppm, parts) | — | — | 1.5 | — | — |
| Hydrotalcite in Example 4 (Na = 14 ppm, parts) | — | — | — | 1.5 | — |
| Hydrotalcite in Comparative Example 1 (Na = 290 ppm, parts) | — | — | — | — | 1.5 |
| Zinc stearate (parts) | 0.5 | 0.5 | 0.5 | 0.5 | 0.5 |
| Transparency (haze) | 6.5 | 6.9 | 7.2 | 6.2 | 10.3 |
| Blooming | none | none | Almost none | none | much |
| Thermal stability | good | good | good | good | good |
| Volumetric resistivity (VR value, Ω · cm) | $5 \times 10^{13}$ | $5 \times 10^{13}$ | $2 \times 10^{13}$ | $8 \times 10^{13}$ | $6 \times 10^{12}$ |

PVC (vinyl chloride resin) produced by Shin Dai-Ichi Vinyl Corporation, ZEST 1000Z
DOP (plasticizer) produced by Taoka Chemical Co., Ltd.

EXAMPLES 8 TO 11, COMPARATIVE EXAMPLE 5

Stabilizer for Vinyl Chloride Resin

The hydrotalcites synthesized in Examples 1 to 4 and Comparative Example 1 were used as a stabilizer for a vinyl chloride resin, and a mixture of a formulation shown in Table 3 was kneaded for five minutes with a 8 inch roll heated to 170° C. and a pressed sheet of 1.0 mm in thickness was produced under the conditions of temperature 170° C., press time 10 minutes, pressure 50 kg/cm² with a press machine using a bared sheet of 0.3 mm in thickness.

The transparency (haze value), the blooming (effusion of powder), the thermal stability and the volume resistivity of the obtained sheets were evaluated by the following methods and the results of evaluation are shown in Table 3.

(Transparency)

With respect to the obtained sheets, a haze value was measured according to JIS K 7136 with a haze meter (produced by NIPPON DENSHOKU INDUSTRIES CO., LTD., NDH 2000).

(Blooming (Effusion of Powder))

The obtained sheet was immersed in hot water of 40° C., and it was taken out 4 hours later and a state of effusion of powder to the surface of the sheet was visually evaluated.

From Table 3, it has become clear that when the hydrotalcite, in which the Na contents contained in the surface or in the interior of the hydrotalcite are 47 ppm, 75 ppm and 14 ppm, are used, these resins have the excellent transparency and the blooming (effusion of powder) does not arise at the surface of the film. And, these resins also have the excellent thermal stability and the excellent volume resistivity.

EXAMPLES 12 TO 13, COMPARATIVE EXAMPLE 6

Neutralizer of Polyolefin Resin

The hydrotalcites synthesized in Examples 1 to 2 and Comparative Example 1 were used as a neutralizer of an acid catalyst residue in a polyolefin resin obtained by polymerization using an acid catalyst, and a film with width of 10 cm and thickness of 100 μm was obtained by extrusion with a extruder. And, by conducting repeated extrusion at 200° C. with a 30 mm single screw extruder, a strand of about 4 mm in diameter was extruded, quenched with water and then cut to obtain pellets.

Using the obtained films and pellets, the yellowness index YI (heat resistance), the occurrence of die drool and the corrosiveness of an iron sheet were evaluated by the following methods and the results of evaluation are shown in Table 4.

(Heat Resistance (Yellowness Index YI) of Resin)

The obtained films were overlaid and this overlaid film was pressed with a hot press to prepare a pressed sheet of 1.0 mm in thickness. The yellowness index YI of the pressed sheet was measured by a color difference meter (produced by NIPPON DENSHOKU INDUSTRIES CO., LTD., SQ-2000).

(Occurrence of Die Drool)

When producing pellets, the presence or absence of stains (die drool) adhering to a die in extruding repeatedly was visually determined.

(Corrosiveness of Iron Sheet)

After the obtained film was bonded at 150° C. to an iron sheet in a state of being polished at the surface with a sand paper, the entire iron sheet was put in a thermo-hygrostat of 50° C., 90% RH to accelerate the corrosiveness and the presence or absence of corrosion was visually determined three days later.

TABLE 4

|  | Example 12 | Example 13 | Comparative Example 6 |
|---|---|---|---|
| Polypropylene (parts) | 100 | 100 | 100 |
| Hydrotalcite in Example 1 (Na = 47 ppm, parts) | 0.1 | — | — |
| Hydrotalcite in Example 2 (Na = 75 ppm, parts) | — | 0.1 | — |
| Comparative Example 1 (Na = 290 ppm, parts) | — | — | 0.1 |
| StabiacePH-1010(parts) | 0.05 | 0.05 | 0.05 |
| StabiaceP-2400(parts) | 0.05 | 0.05 | 0.05 |
| Extrusion (1st) yellowness index YI | 4.6 | 4.9 | 5.2 |
| Extrusion (2nd) yellowness index YI | 4.8 | 5.1 | 5.4 |
| Extrusion (3rd) yellowness index YI | 5.1 | 5.4 | 5.7 |
| Occurrence of die drool | none | none | occur at 2nd |
| Corrosiveness of iron sheet | none | none | present slightly |

Polypropylene (produced by UBE INDUSTRIES, LTD., polyethylene F522N)
Stabiace PH-1010 (produced by Sakai Chemical Industry Co., Ltd., phenolic antioxidant)
Stabiace P-2400 (produced by Sakai Chemical Industry Co., Ltd., phosphorus antioxidant)

From Table 4, it has become clear that when the hydrotalcite, in which the Na contents contained in the surface or in the interior of the hydrotalcite are 47 ppm and 75 ppm, are used, the die drool is significantly reduced without reducing an effect of neutralizing resin. And, it has become evident that an increase in a yellowness index YI due to the degradation of resin can be prevented. Further, these resins showed the excellent results in the corrosiveness of an iron sheet. On the other hand, it has become evident that when the hydrotalcite having the Na contents of 290 ppm is used, the die drool tends to develop and the heat resistance of the resin (yellowness index YI) becomes bad when the resin is extruded repeatedly at 270° C. with a single screw extruder.

INDUSTRIAL APPLICABILITY

The hydrotalcite of the present invention can be suitably used as a resin additive for various synthetic resins. And, the synthetic resin composition containing the above hydrotalcite and the synthetic resin can be suitably used as a film for agricultural uses, which are used for houses or tunnels in protected horticulture.

The invention claimed is:

1. A method of producing hydrotalcite of formula:

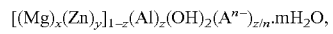

wherein $A^{n-}$ represents an anion having a valence of n; x, y, z and m are values which satisfy the following expressions, $0.5 \leq x \leq 1$, $0 \leq y \leq 0.5$, $x+y=1$, $0.1 \leq z \leq 0.5$, and $0 \leq m < 1$, the method comprising the steps of:

providing a slurry of hydrotalcite, wherein the hydrotalcite slurry is obtained using magnesium sulfate as the magnesium source; and washing the slurry with water, wherein said hydrotalcite slurry is obtained by combining magnesium sulfate, aluminum sulfate, sodium hydroxide, and sodium carbonate, and optionally zinc sulfate; and subjecting the combination to a hydrothermal synthesis at a temperature of 120° to 250° C.;

and further wherein the hydrotalcite has a sodium content of 100 ppm or less and a specific surface area of 1 to 40 m²/g.

2. The method of producing the resin additive that is a hydrotalcite according to claim 1, further comprising a surface treating step.

3. The method of producing hydrotalcite of claim 1 wherein the combining comprises combining (a), an aqueous solution of magnesium sulfate, aluminum sulfate, and optionally zinc sulfate, with (b), an aqueous solution of sodium hydroxide and sodium carbonate.

4. The method of producing hydrotalcite of claim 3 wherein the combining comprises simultaneous charging of the aqueous solutions to a vessel, with agitation, to produce the hydrotalcite slurry.

5. The method of producing hydrotalcite of claim 1 wherein the washing step is selected from:

filtering and washing with water, repulping and washing with water, and separating water from the slurry by decantation or centrifugation followed by washing of remaining solids with water.

* * * * *